Figure 1:
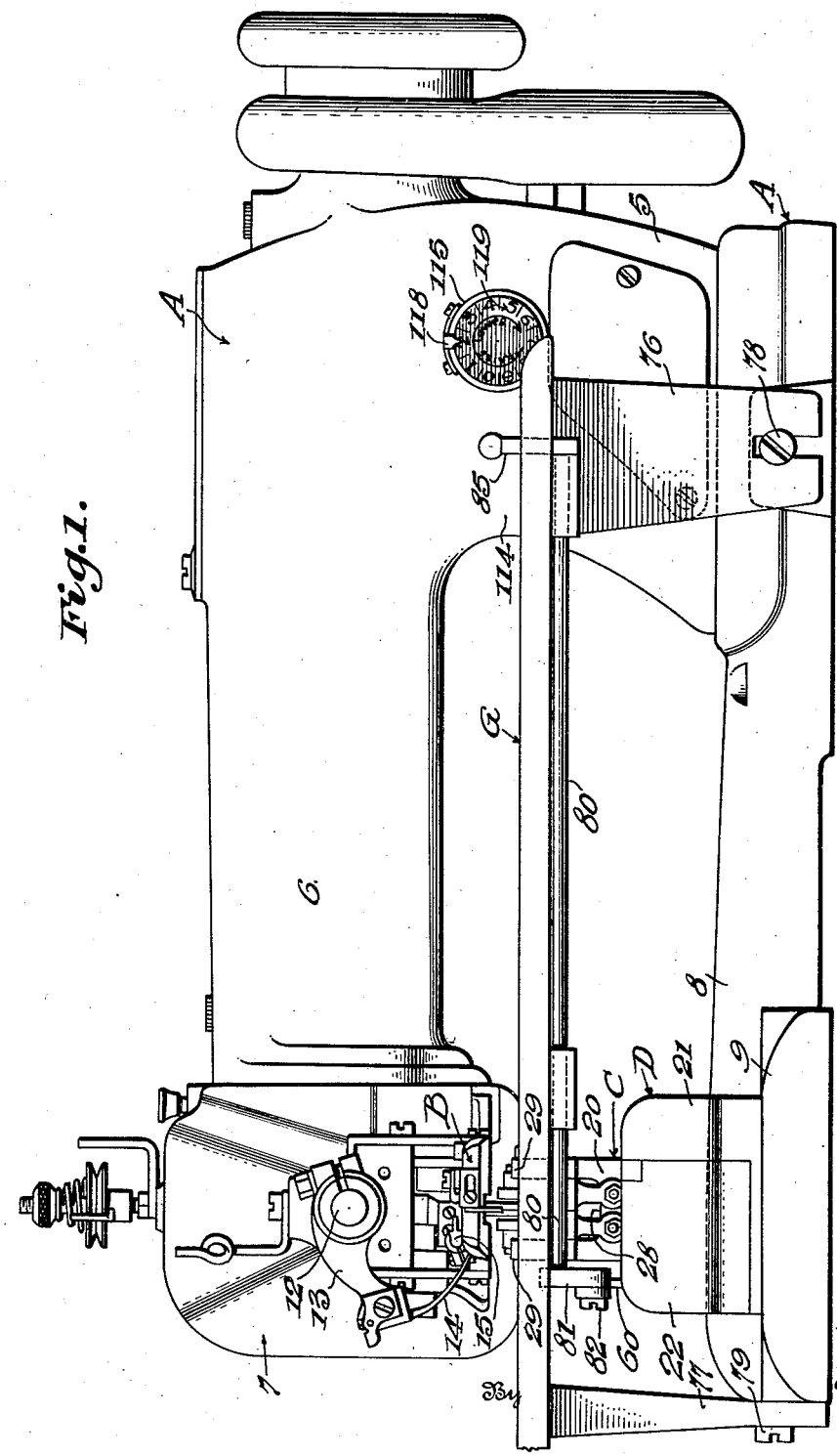

Oct. 10, 1939.　　　C. W. MUELLER　　　2,175,967
SEWING MACHINE
Filed Feb. 26, 1937　　　15 Sheets-Sheet 1

Inventor
C. W. Mueller
S. George Tate
Attorney

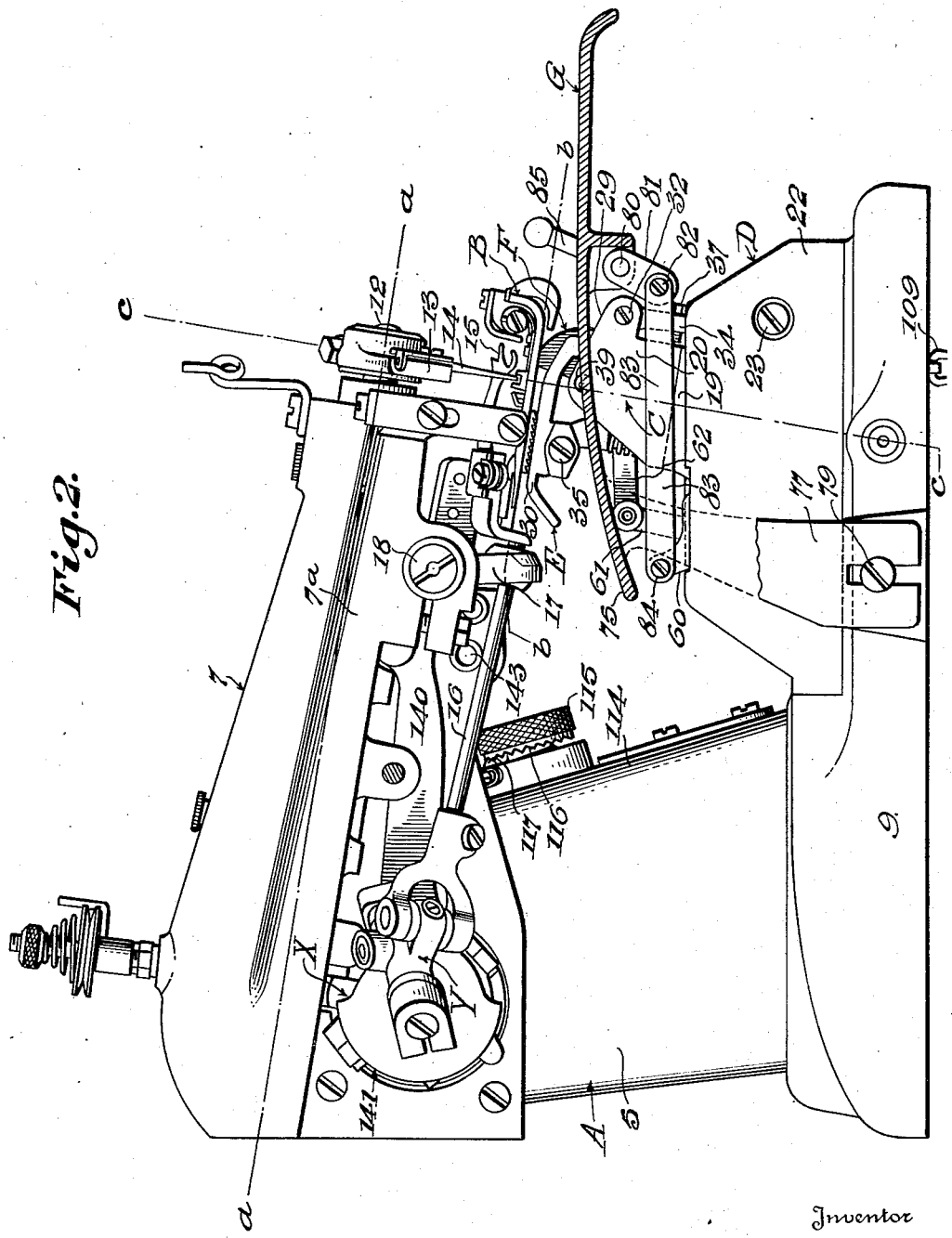

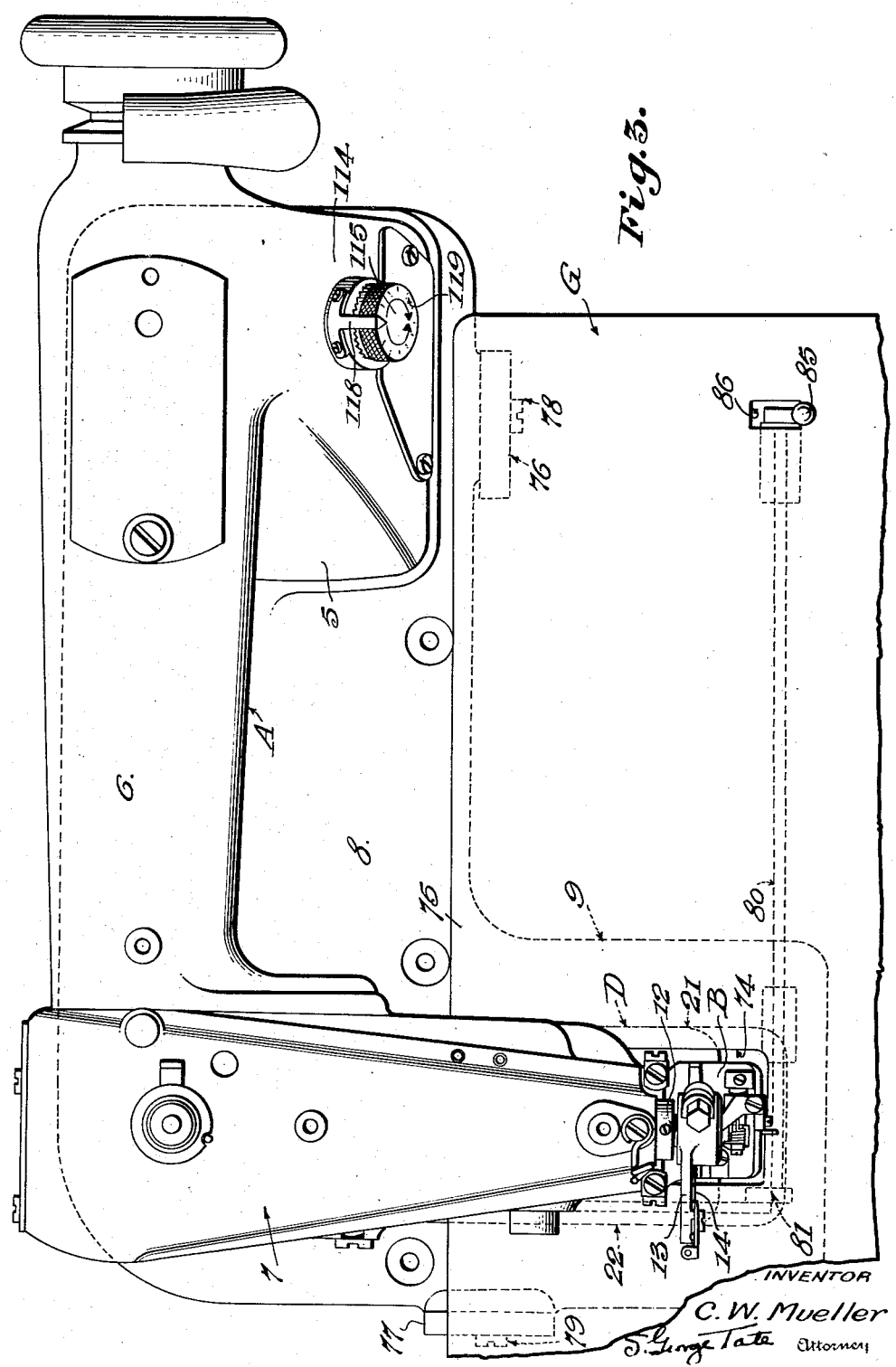

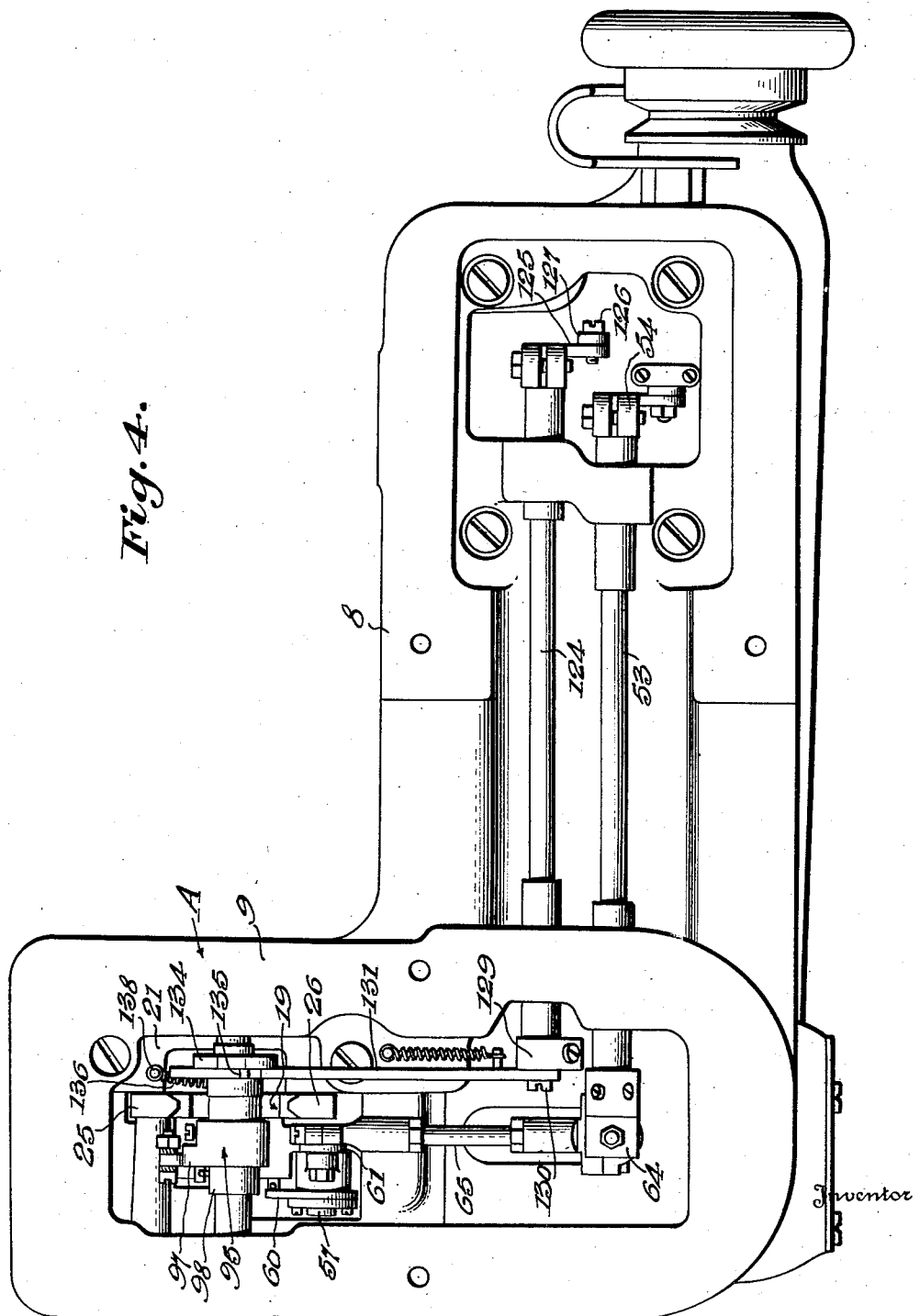

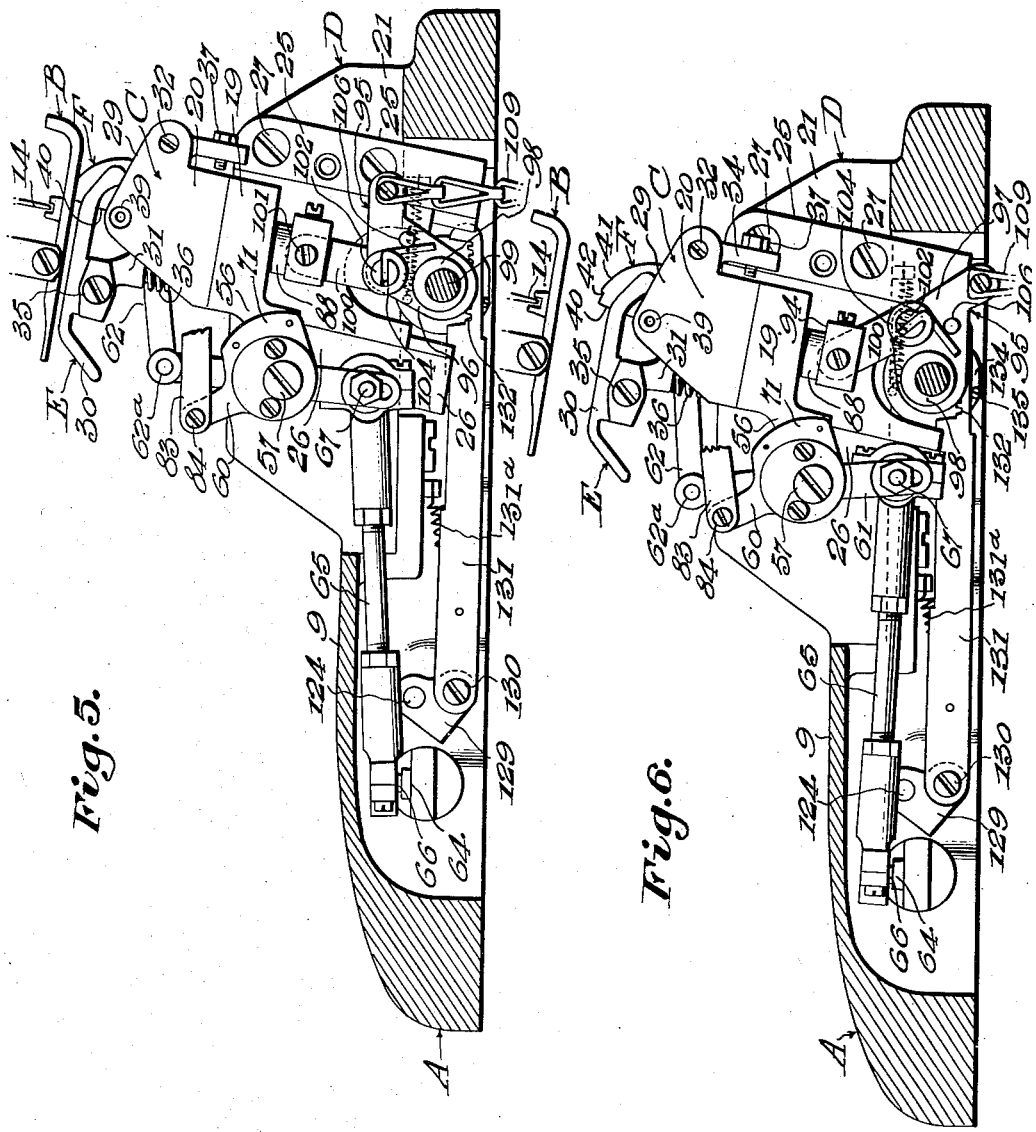

Oct. 10, 1939.   C. W. MUELLER   2,175,967
SEWING MACHINE
Filed Feb. 26, 1937   15 Sheets-Sheet 6

Inventor
Charles W. Mueller
By S. George Tate
Attorney

Oct. 10, 1939.　　　C. W. MUELLER　　　2,175,967
SEWING MACHINE
Filed Feb. 26, 1937　　15 Sheets-Sheet 7

Charles W. Mueller
By S. George Tate
Attorney

Oct. 10, 1939.  C. W. MUELLER  2,175,967
SEWING MACHINE
Filed Feb. 26, 1937  15 Sheets-Sheet 8

Inventor
Charles W. Mueller
By S. George Tate
Attorney

Oct. 10, 1939.   C. W. MUELLER   2,175,967
SEWING MACHINE
Filed Feb. 26, 1937   15 Sheets-Sheet 9
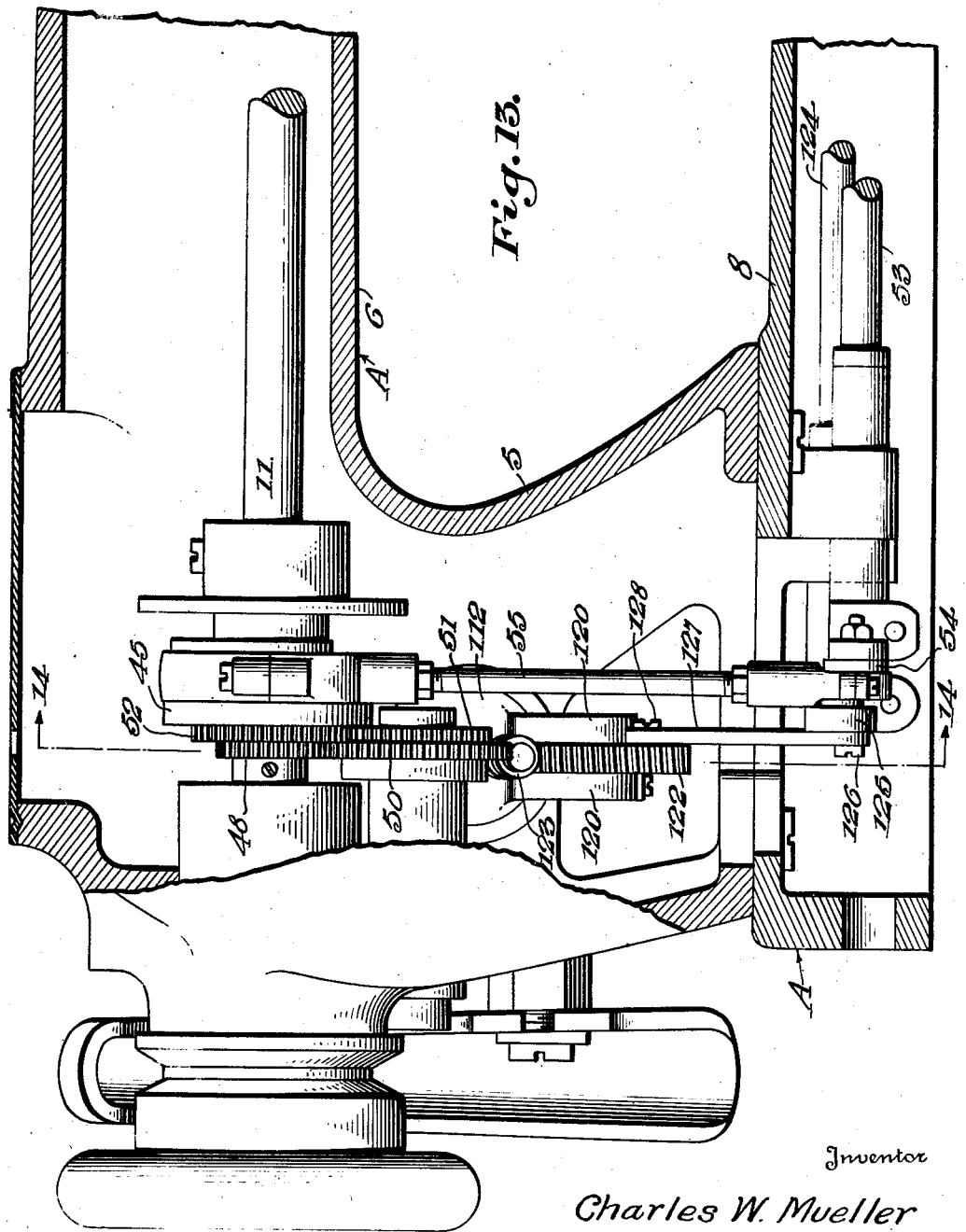
Inventor
Charles W. Mueller
By S. George Tata
Attorney

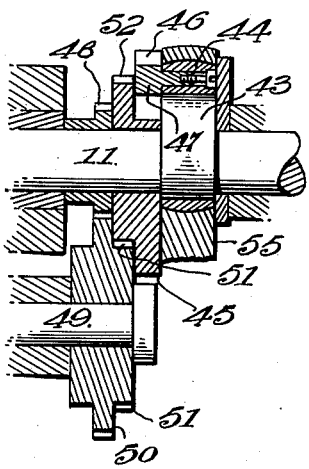

Oct. 10, 1939.　　　C. W. MUELLER　　　2,175,967
SEWING MACHINE
Filed Feb. 26, 1937　　　15 Sheets-Sheet 11
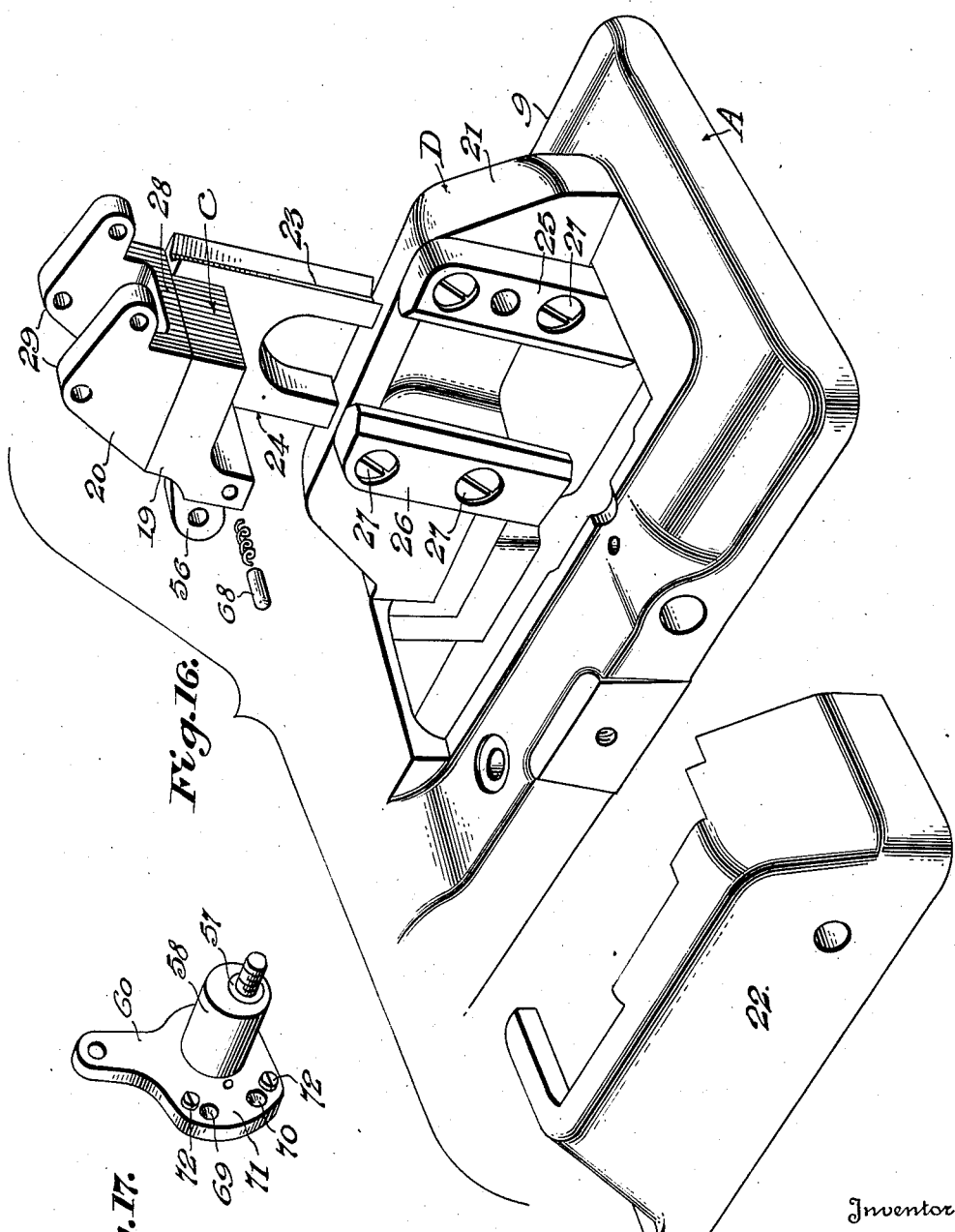
Inventor
Charles W. Mueller
By J. George Tate
Attorney

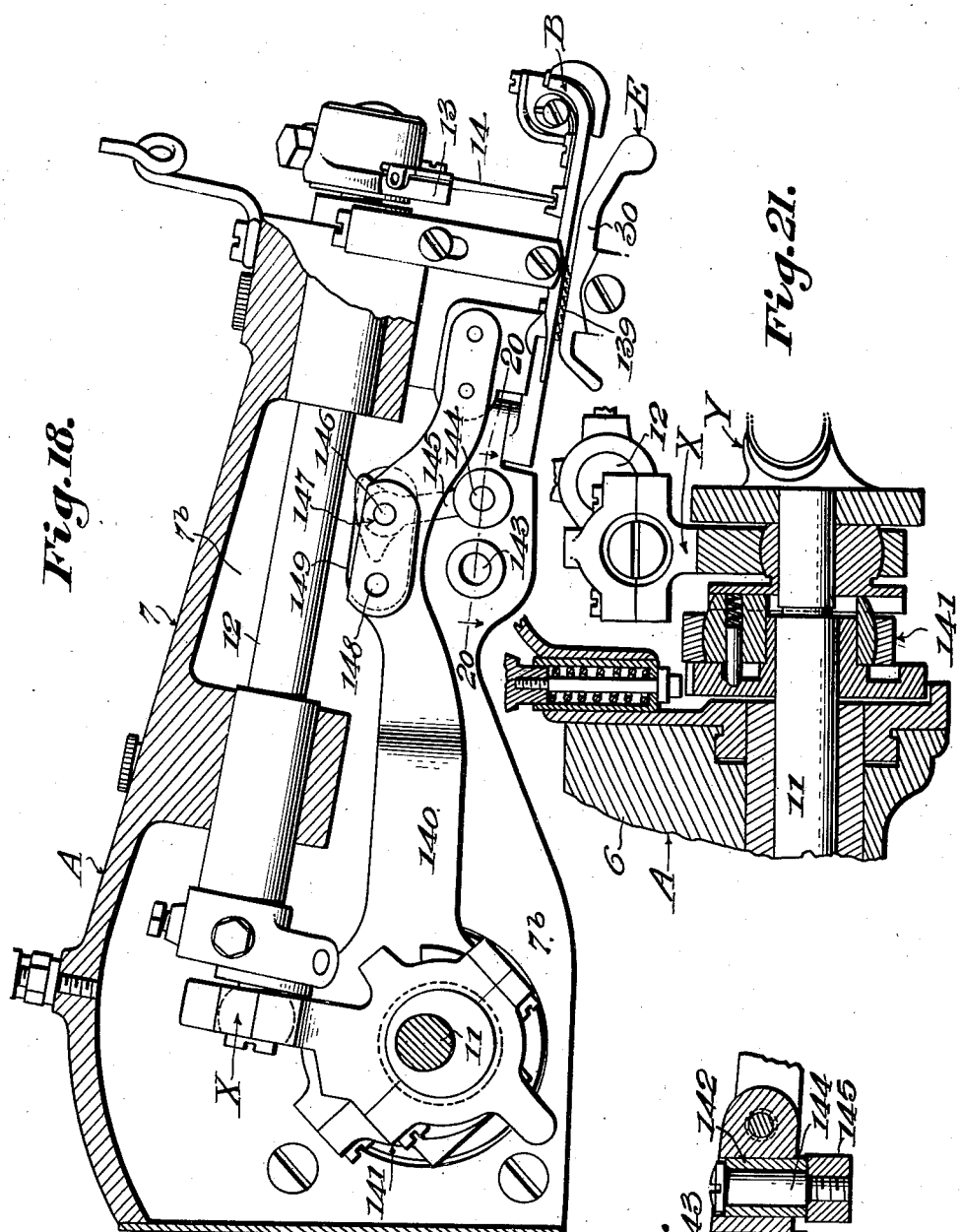

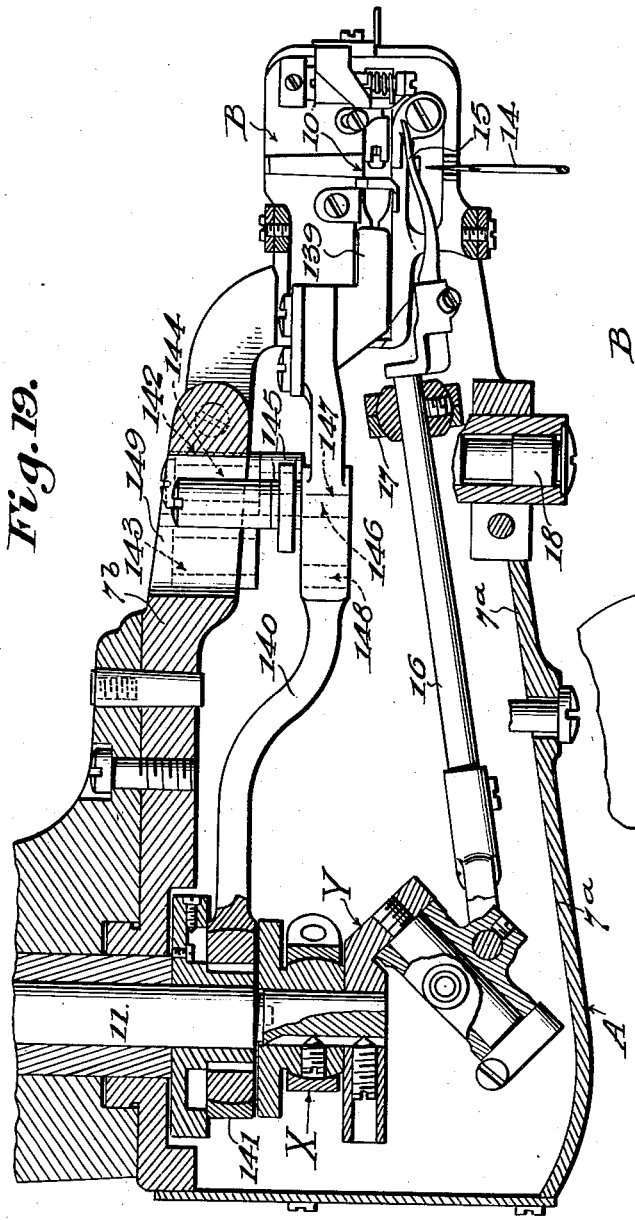

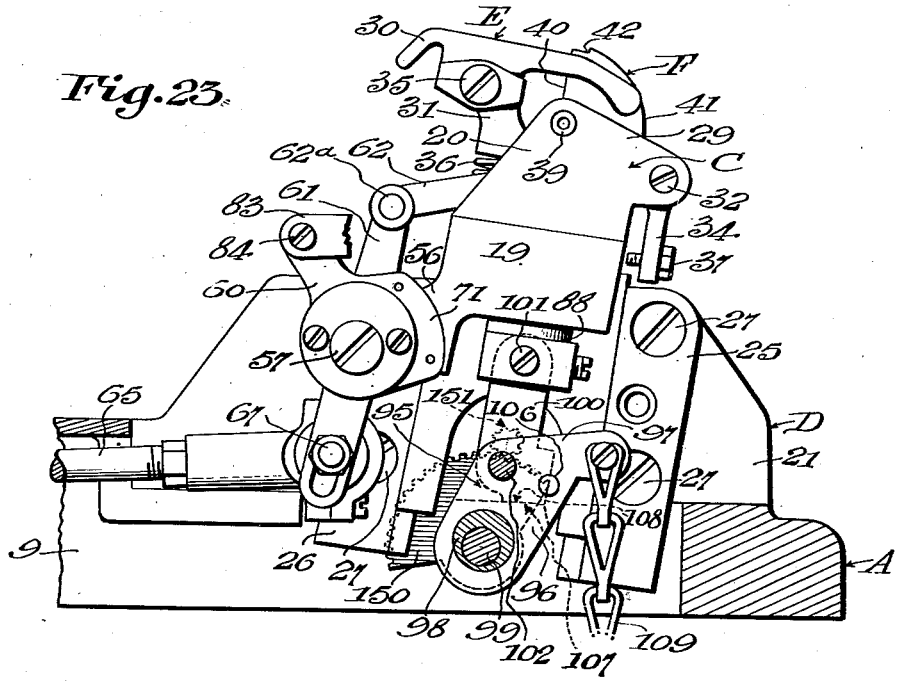
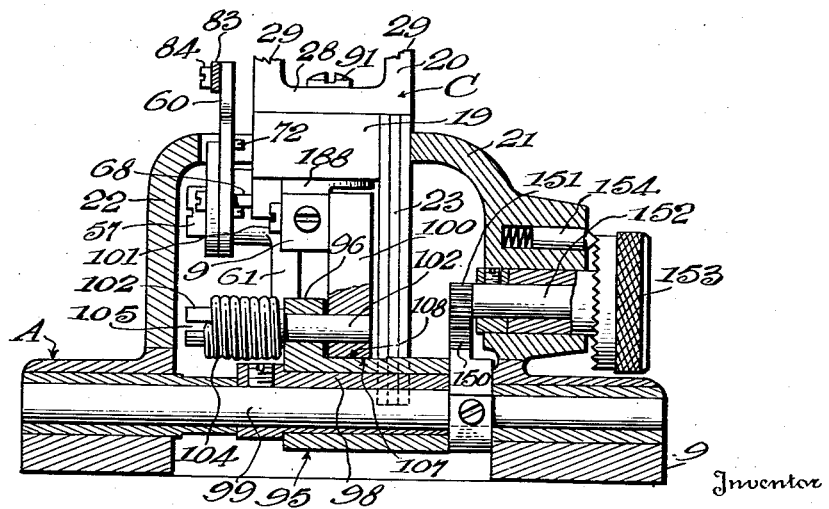

Oct. 10, 1939.    C. W. MUELLER    2,175,967
SEWING MACHINE
Filed Feb. 26, 1937    15 Sheets—Sheet 15

Inventor
Charles W. Mueller
By S. George Tate
Attorney

Patented Oct. 10, 1939

2,175,967

UNITED STATES PATENT OFFICE 2,175,967

SEWING MACHINE

Charles W. Mueller, St. Louis, Mo., assignor to Lewis Invisible Stitch Machine Company, St. Louis, Mo., a corporation of Maine Application February 26, 1937, Serial No. 127,983

39 Claims. (Cl. 112—176)

This invention relates to new and useful improvements in sewing machines generally, although more particularly to a blind stitch sewing machine of the post type such as is shown in my prior Patents 2,038,848 and 2,038,849 issued Apr. 28, 1936.

In the sewing rooms of factories, the sewing machines are placed on tables which are of uniform height. It is of course desirable to locate the stationary presser foot in a horizontal plane which is comfortable for the operator when feeding work through the machine. In some operations more room is required under the upper frame arm for the free passage of the work than in others.

In some operations, the work overlies the post and therefore the manual means shown in my prior patents for adjusting the vertical position of the post to thereby vary the depth of needle penetration is under these conditions not readily accessible to the operator.

The machine of my prior Patent 2,038,848 produces all deep or "anchor" stitches, whereas the machine of my prior Patent 2,038,849 produces alternate deep and shallow stitches, i. e., "anchor" and "skip" stitches, but is devoid of any means for changing to all deep or "anchor" stitches.

Among the several objects of the present invention are to provide a machine wherein the stationary presser foot will remain at the same height relative to the operator and yet afford increased room under the upper arm for the passage of work; to provide a remote control for vertically adjusting the position of the post with respect to the path of the needle whereby the machine will be initially set for a predetermined depth of needle penetration in the material being stitched, and to provide manually operable means for varying the effective height of the ridge forming element which is mounted on the post whereby either all shallow stitches, or alternate deep and shallow stitches may be produced.

With these and other objects in view which will more fully appear, the nature of the invention will be more clearly understood by following the description, the appended claims, and the several views illustrated in the accompanying drawings.

Figure 7:
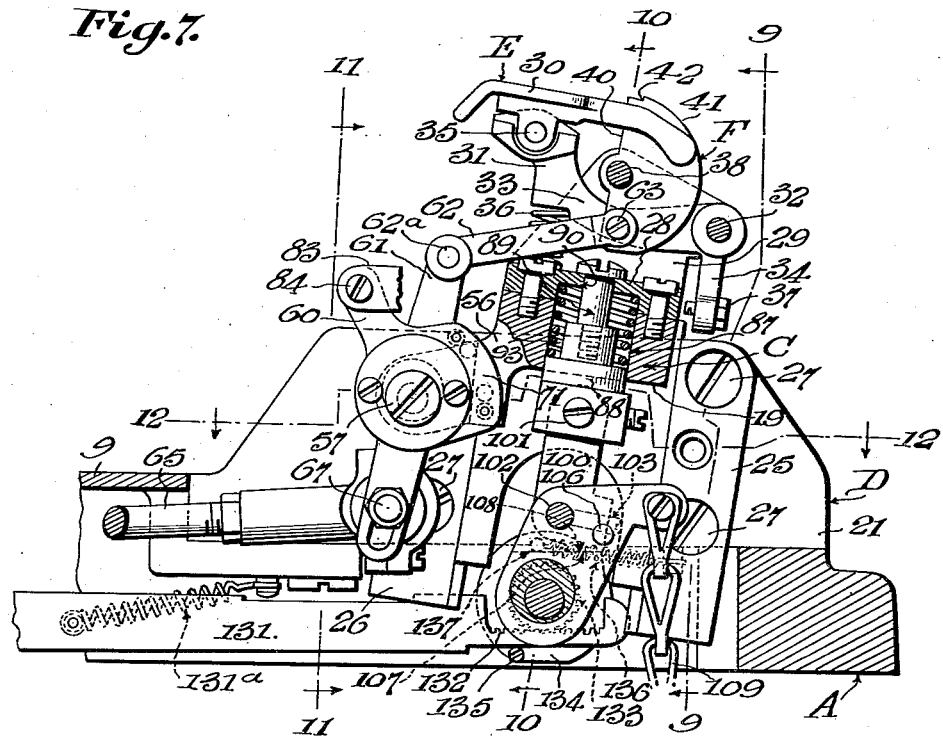
Figure 8:
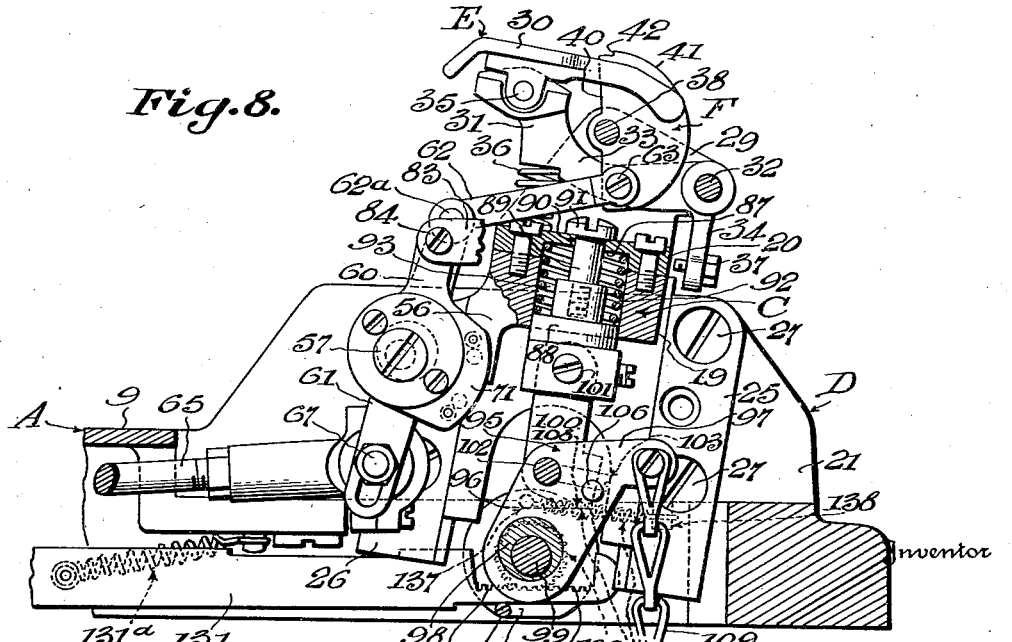
Figure 9:
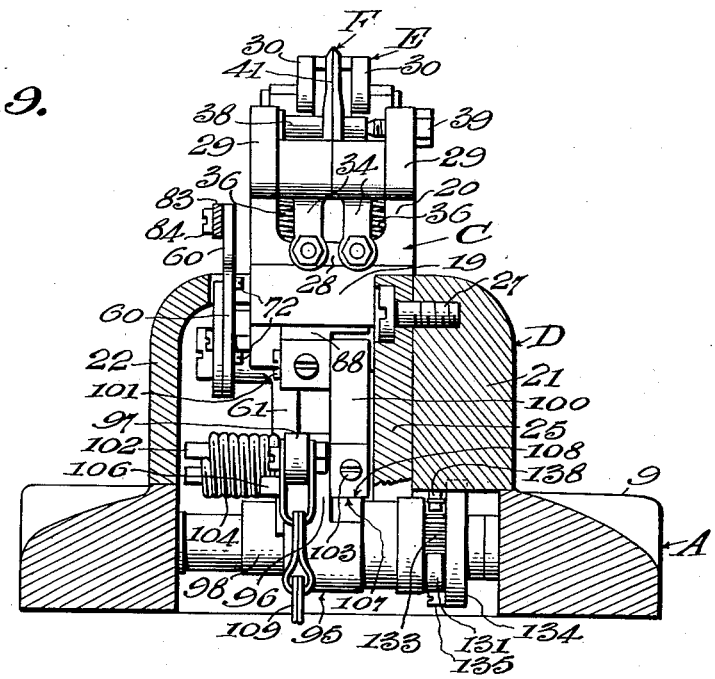
Figure 10:
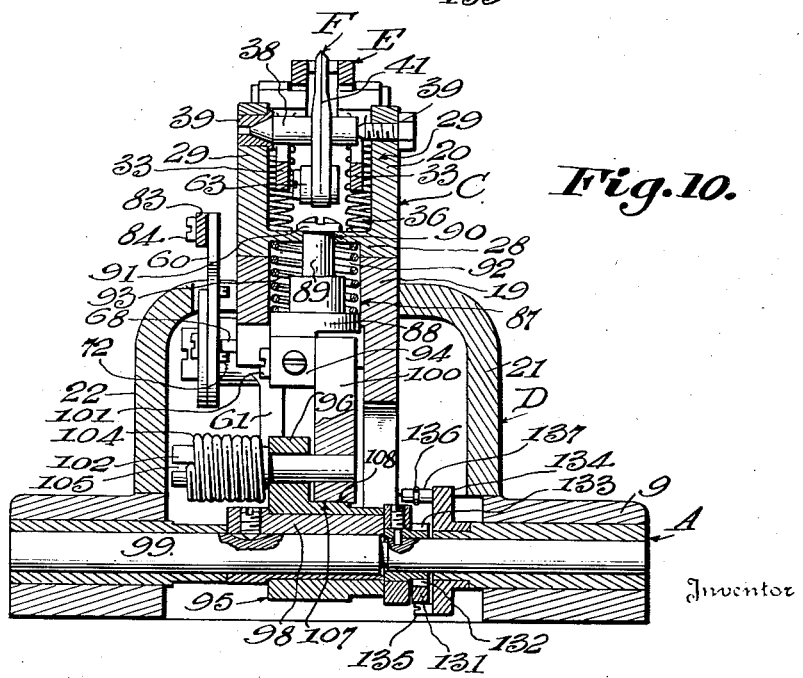
Figure 11:
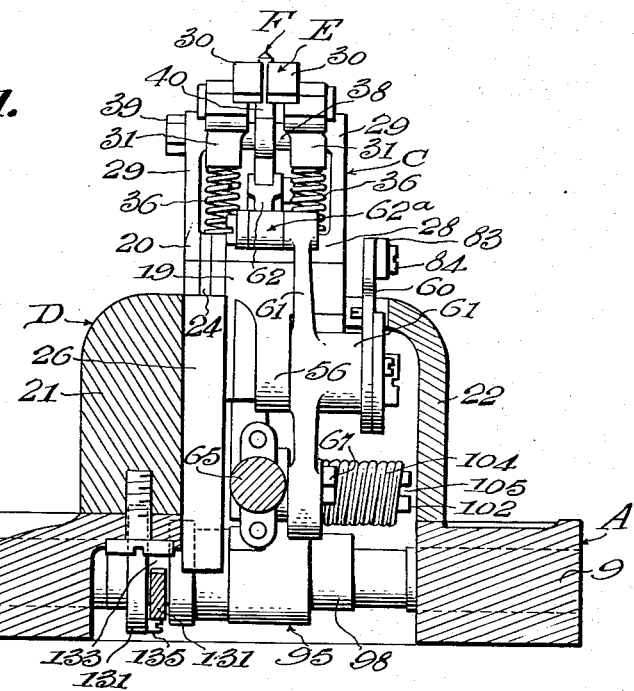
Figure 12:
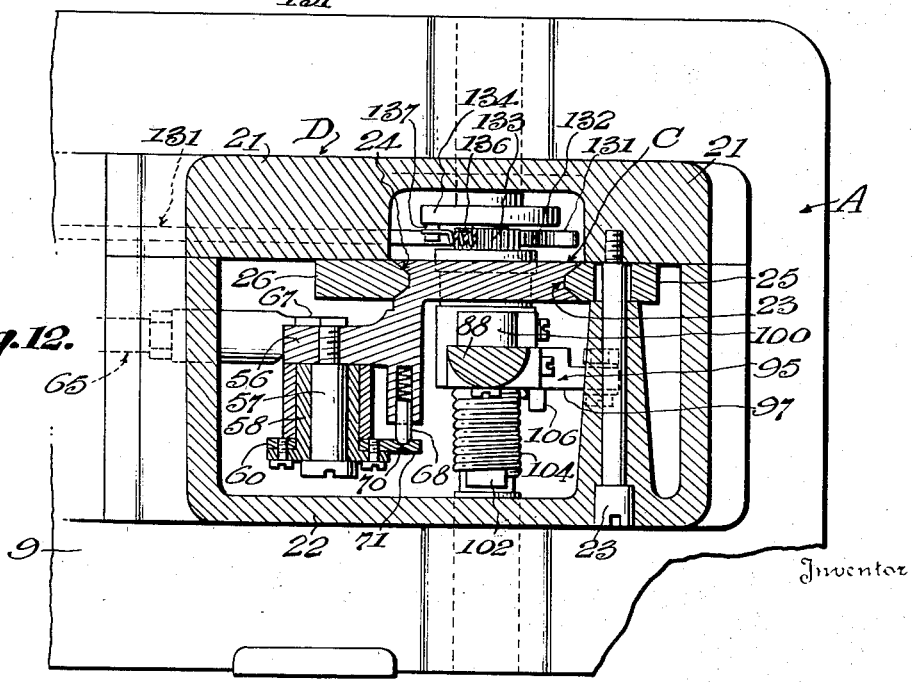
Figure 27:
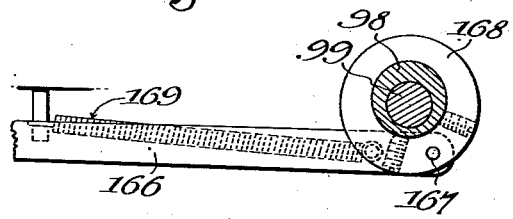
Figure 25:
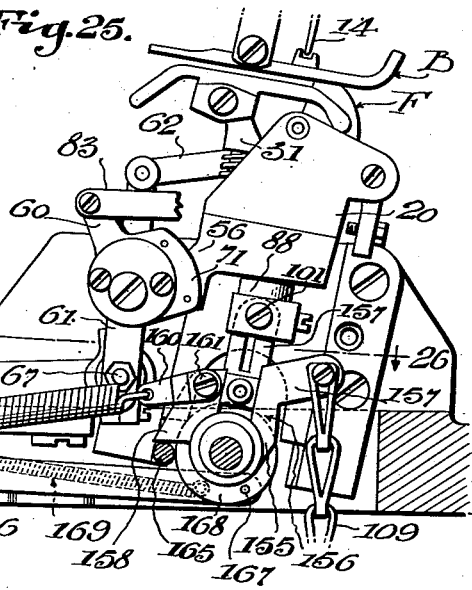
Figure 26:
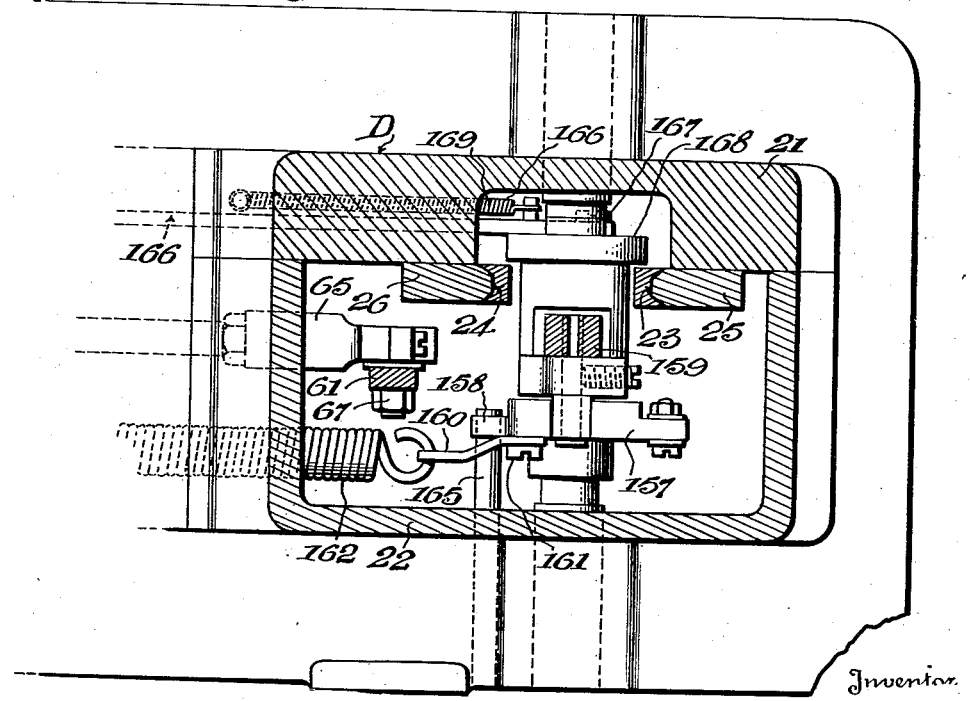

In the drawings:

Figure 1 is a front elevation of a sewing machine constructed in accordance with my invention, Figure 2 is a left end elevation thereof, the work support being shown in section, Figure 3 is a top plan view of the machine, Figure 4 is a bottom plan view thereof, Figure 5 is a vertical section showing the post and the mechanism mounted thereon in elevation and in operative position, Figure 6 is a similar view but showing the post and the mechanism mounted thereon in elevation and in a depressed position, Figure 7 is a vertical section showing the post and the mechanism in section and showing the disc actuating lever in one position of adjustment, Figure 8 is a similar view but showing the disc actuating lever in its other position of adjustment, Figure 9 is a vertical section taken on the line 9—9 of Fig. 7, Figure 10 is a vertical section taken on the line 10—10 of Fig. 7, Figure 11 is a vertical section taken on the line 11—11 of Fig. 7, Figure 12 is a horizontal section taken on the line 12—12 of Fig. 7, Figure 13 is an enlarged vertical section taken through the standard and base and showing the driving means for the disc, Figure 14 is a vertical section taken on the line 14—14 of Fig. 13, Figure 15 is a detail section of the reduction gear coupling, Figure 16 is a perspective view of the post housing, the post, and the removable cover plate arranged in separated relation, Figure 17 is a perspective view of the disc adjusting lever and eccentric mounting therefor, Figure 18 is a vertical longitudinal section through the forwardly extending arm, and showing the top feed mechanism and the needle driving mechanism, Figure 19 is a horizontal section thereof, Figure 20 is a detail section taken on the line 20—20 of Fig. 18, Figure 21 is a detail section of the driving connections for the needle shaft, the looper bar and the top feed bar, Figure 22 is an enlarged plan view of the presser foot, Figure 23 is a detail view showing a modified form for vertically adjusting the post, Figure 24 is a sectional view thereof, Figure 25 is a view similar to Fig. 23 but showing a retractile spring interposed between the toggle lever and the base arm, Figure 26 is a horizontal section taken on the line 26—26 of Fig. 25, and Figure 27 is a detail view of the link and lever connection shown in Figs. 25 and 26.

By reference to the accompanying drawings, it will be seen that my invention includes a main frame A which comprises a standard 5 having a horizontal upper arm 6 extending laterally from the upper end thereof and terminating in a forwardly extending upper arm 7 whose major axis inclines forwardly and downwardly as indicated by the numerals a—a in Figure 2, and a horizontal base arm 8 which extends laterally from and below the base of the standard and terminates in a forwardly extending horizontal base arm 9, the upper arms 6, 7 being spaced above and disposed in substantial registration with the base arms 8, 9 and the upper arm 7 being downwardly inclined relative to the base arm 9. Preferably, the standard 5 and the upper arm 6 are cast as a single unit, the base arms 8 and 9 as a single unit, and the forwardly extending upper arm 7 as a single unit, the units being rigidly although removably connected together by screws or other fastening means.

Rigidly fixed to the forward or free end of the upper arm 7, is a horizontal presser foot B having a centrally located longitudinal opening or slot 10 formed therein, the presser foot being forwardly and downwardly inclined in a plane disposed in parallelism to the major axis of the upper arm 7, the plane of the foot being indicated by the numerals b—b in Figure 2.

Journaled in the upper end of the standard 5 and in the upper arm 6 is a main shaft 11. Journaled in the forwardly extending upper arm 7 and extending longitudinally thereof is an oscillatory needle shaft 12 having a needle arm 13 fixed to its front end. This shaft 12 is located directly above the opening 10 of the presser foot B, and has its longitudinal axis in the downwardly and forwardly inclined plane a—a. Attached to the needle arm 13 is a curved needle 14 which reciprocates across said opening 10 of the foot. The needle shaft 12 is oscillated from the main shaft 11 by connections which are indicated as a whole by the reference letter X. A looper or spreader 15 cooperates with the needle 14 in the usual manner to form single thread chain stitches, although any other type of complemental stitch forming mechanism may be employed if desired. The looper 15 is fixed to a looper rod 16 which is fulcrumed on a depending arm 17 pivoted on a horizontal pin 18 mounted in the left hand wall 7ª of the arm 7. The looper rod 16 is driven from the main shaft 11 by the usual connections which are indicated as a whole by the reference letter Y.

Located directly under the presser foot B and movable upwardly towards the foot and downwardly therefrom, is a work supporting post C consisting of a base 19 and a head 20, the post being movable in an upwardly and forwardly inclined plane c—c which is disposed at right angles to the plane b—b of the presser foot. The post C is rectangular in horizontal cross section and is mounted in a 2-part well or housing D, the right hand part or wall 21 being rigid with and projecting upwardly from the forward end of the base arm 9, and the left hand part or wall 22 constituting a removable cover for the post and certain movable parts which are located therein, the cover 22 being attached to the stationary wall 21 by a screw 23. The upper edge of the housing D is located below and in spaced relation to the presser foot B, and the upper portion of the post C projects upwardly above said upper edge. The walls 21, 22 of the housing are conjointly formed with an opening to freely receive the post C. The post C is guided in its vertical movements by front and rear vertical grooves 23, 24 formed in the post and cooperating front and rear vertical guide bars 25, 26 which are detachably connected to the inner face of the stationary wall 21 by screws 27. The head 20 of the post is U-shaped in vertical cross section to form a base 28 and side walls 29, 29.

Carried by the post C and bodily movable up and down therewith are a work clamp E and a ridge-forming element F.

The work clamp E includes two separate clamping plates 30, 30 which are relatively long and narrow, and cooperate with the bottom of the presser foot B to clamp the work therebetween during the penetrating strokes of the needle. Bell crank levers 31, 31 are arranged side by side between the walls 29, 29 of the post head 20 and are fulcrumed at their angles on a transverse pin 32 mounted in the forward portions of the walls 29, each lever including a rearwardly extending or horizontal arm 33 and a downwardly extending or vertical arm 34. The arms 34, 34 project downwardly in front of the base 28 of the post head 20. The clamping plates 30, 30 are centrally journaled on transverse pivot pins 35, 35 mounted in the rearwardly extending arms 33, 33 for independent rocking movements. Coil springs 36, 36 are disposed between the arms 33, 33 and the base 28 and function to yieldably retain the clamping plates against depression. Adjustable stop screws 37, 37 are threaded into the lower ends of the vertical arms 34, 34 and cooperate with the front wall of the base 28 to variably limit the upward movements of the clamping plates.

The ridge-forming element F which projects nodes of material upwardly through the slot 10 of the presser foot into needle penetrating position, comprises a disc which is located between the clamping plates 30, 30 and in front of the pivots 35, 35. The disc is fixed to a transverse rock shaft 38 which is journaled in bearings 39, 39 mounted in the walls 29, 29 of the post head 20 whereby the disc may be oscillated forwardly and rearwardly. The axis of the disc i. e., the shaft 38, is located below and in parallelism with the path of movement of the needle 14, or in other words, at right angles to the line of feed. It will be also observed that the disc is located directly below the needle shaft 12, and in register with the opening 10 of the presser foot B, and is adapted to project intermittently nodes of material upwardly through said opening 10 into needle penetrating position. The disc is sector shaped in side elevation and includes a rear radial wall 40 which merges with the concentric periphery 41 of the disc. The periphery of the disc at the rear end thereof is cut away to provide a low peripheral portion or step 42 which merges with the rear radial wall 40. Thus it will be seen that the disc is provided with high and low peripheral portions, or portions which are of different radii, and that these portions are arranged in tandem.

The disc is reciprocated from the main shaft 11 by a train of mechanism including a manually controlled lever whereby either the high and low portions 41, 42 of the disc will be alternately presented to the needle to thereby form alternate "anchor" and "skip" stitches in the material or whereby the high portion 41 of the disc will be successively presented to the needle to thereby form successive "anchor" stitches in the material.

To this end, a driving eccentric 43 is fixed to the main shaft 11 within the standard 5, and surrounding this eccentric is an eccentric sleeve 44 which is positively rotated on the eccentric but at one-half the speed thereof. A disc 45 which is loosely mounted on the main shaft is provided with an inwardly extending radial slot 46 for receiving a slide block 47 carried by the eccentric sleeve 44. A relatively small driving gear 48 is fixed to the main shaft for rotating the eccentric sleeve once for every two revolutions of the main shaft through the medium of a reduction gear coupling. This coupling comprises a stationary countershaft 49 which is mounted in the standard 5 below the main shaft, a relatively large gear 50 which is journaled on the countershaft and in constant mesh with the gear 49, a gear 51 fixed to the gear 50 to rotate therewith, and a gear 52 fixed to the disc 45, the gears 48, 50 having a 1-to-2 ratio and the gears 51, 52 having a 1-to-1 ratio. A rock shaft 53 is journaled in the base arm 8 and extends longitudinally thereof and into the standard 5 and base arm 9. A rock arm 54 is fixed to the shaft 53 below the driving eccentric 43 and the eccentric sleeve 44, and a pitman 55 has it upper end fitted around the eccentric sleeve and its lower end pivotally connected to the rock arm 54. The head 20 of the post C is provided with a rearwardly extending bearing lug 56 which supports a transverse pivot pin 57 on which is journaled an eccentric bushing 58 having an upwardly extending rock arm 60 rigidly connected thereto. A vertically disposed lever 61 is fulcrumed centrally on the eccentric bushing 58. It will be noted that the eccentric bushing 58 constitutes a shiftable fulcrum for the lever 61, and that upon movement of the rock arm 60 the fulcrum will be shifted either towards or from the disc shaft 38. A forwardly extending link 62 is pivotally connected at its rear end as at 62ª to the upper end of the lever 61 and at its forward end as at 63 to the disc F at a point below the axis thereof. A rock arm 64 is fixed to the rock shaft 53 at a point in alinement within the base arm 9, and a link 65 which extends longitudinally with said base arm 9 is pivotally connected at its rear end as at 66 to the rock arm 64 and at its forward end to the lower end of the lever 61 as at 67.

From the above, it will be understood that by reason of the eccentric sleeve 44 being rotated once for every two revolutions of the main shaft, the disc F, through the driving connections just described, will partake of a greater angular movement during alternate rearward strokes thereof and a lesser angular movement during intermediate rearward strokes.

It will also be understood that when the rock arm 60 is in its rearward position, the eccentric bushing 58 will be in a position to cause the lever 61 to oscillate the disc F and thereby alternately present the high and low peripheral portions 41, 42 of the disc to the needle to effect the formation of alternate "anchor" and "skip" stitches in the material, or in other words, to alternately vary the depth of the needle penetrations in the material. When, however, the rock arm 60 is moved forwardly, the eccentric bushing 58 will be correspondingly rotated to thereby shift the fulcrum of the lever 61 forwardly. This causes the lever 61 to swing forwardly about the pivot 67 and bodily move the link 62 forwardly, thereby rocking the disc F rearwardly whereby the high peripheral portion 41 thereof will be presented to the needle during every oscillation of the disc. This results in the successive formation of deep or "anchor" stitches in the material, or, in other words, a uniform depth of needle penetrations in the material during the formation of successive stitches. It will, therefore, be seen that the machine is capable of forming either alternate deep and shallow stitches, i. e., "anchor" and "skip" stitches, or successive deep or "anchor" stitches, and that the change may be effected while the machine is running.

In order to releasably retain the rock arm 60 in either of its extreme positions, a spring pressed plunger pin 68 is mounted in the base 19 of the post C for cooperation with either of two seats 69, 70 which are formed in a forwardly projecting offset portion 71 of said rock arm 60, said portion 71 overlying the base 19 and the pin 68. Upper and lower stop screws 72, 72 are mounted on the offset portion 71 above and below the seats 69, 70 for cooperation with the pin 68.

A substantially horizontal work support G is located in front of the standard 5 and is provided adjacent its left end with a forwardly extending slot 74 for receiving the post C, the work clamp E and the disc F. The work support G is disposed in a horizontal plane below the upper frame arm 6 but in front thereof, the support being transversely curved to form a resultant downwardly extending rear edge portion 75. The support is rigidly although removably secured to the main frame A through the medium of downwardly extending bracket arms 76, 77 which are respectively clamped to the front right hand edge of the base arm 8 and to the edge of the forwardly extending base arm 9 by clamping screws 78, 79.

It will be observed that the left hand end of the work support G is disposed above the control rock arm 60, and in order to facilitate the operation of said arm I have provided a remote control therefor. To this end, a rock shaft 80 is journaled in bearings which depend from the work support. This shaft extends across the work support and in front of the post C. The left hand end of the shaft is provided with a rock arm 81 which is pivotally connected by a screw 82 with the forward end of a link 83, the rear end of which is pivotally connected by a screw 84 with the rock arm 60. The right hand end of the shaft is disposed in front of the standard 5 and is provided with a manually operable rock lever 85 which projects upwardly through a slot 86 in the work support. Thus, by means of the lever 85, the shaft 80, and the link 83, the control lever 60 may be readily actuated. It will be observed that by placing the shaft 80 under the work support and by placing the lever 85 in front of the standard, the space on the work support directly in front of the space under the overhanging arm 6 of the main frame is unobstructed and consequently the work may be moved rearwardly with perfect freedom.

In some sewing operations, the work support will not be required and under these circumstances the work support together with the remote control for the disc may be readily removed as a unit by simply removing the clamping screws 78, 79 and the pivot screw 84, and the rock arm 60 may then be manually and directly operated as a control lever for the disc C.

The post C is capable normally of a small free vertical movement to permit not only a variation in the thickness of materials being stitched, but also to permit seams being fed over the ridge-forming disc F. To this end, the head 19 and base 20 of the post C are conjointly formed with a centrally disposed bore 87 which extends into the post from the lower end thereof, and mounted in said bore is a core or support 88. A limiting screw 89 passes downwardly through a non-threaded opening 90 in the head 20 and has its lower end threaded into the core or support 88, the head 91 of the screw cooperating with the head 20 of the post to limit the upward movement of the post relative to the core. The upper surface of the core is normally spaced below the upper end of the bore 87 and the upper portion of the core is reduced to form a resultant peripheral recess 92 for receiving a coil spring 93 which engages the bottom wall of the recess and the upper end of the bore 87 and functions to yieldably retain the post C against downward movement relative to the core 88.

The support or core 88 is normally locked against vertical movement, but when the core is moved vertically the post C, the work clamp E and the disc F are moved with it. The lower end of the core 88 is provided with a depending lug 94. A toggle is connected to the lug 94 and to the base arm 9 of the main frame. The toggle includes a bell crank lever 95 which includes a substantially vertical arm 96 and a forwardly extending and substantially horizontal arm 97. The lower end of the arm 96 is fulcrumed on an eccentric 98 which is fixed to a horizontal shaft 99, the latter extending across the well D and below the core 88 and having its ends journaled in the base arm 9 of the main frame. A normally vertically disposed link 100 is pivotally connected at its upper end by a pin 101 to the lug 94 and at its lower end by a pin 102 to the upper end of the toggle lever arm 96, the pin 102 being rigidly secured to the link 100 by a set screw 103. A coil spring 104 is disposed around the projecting end of the pin 102, one end of the spring being anchored in a transverse slot 105 formed in the end of the pin and the other end of the spring engaging under a stop pin 106 fixed to the bell crank lever 95. The spring 104 functions to yieldably retain the toggle elements 96, 100 in their vertical or locked positions, and a stop shoulder 107 fixed to the vertical arm 96 cooperates with a stop shoulder 108 on the bottom of the link 100 to prevent the toggle elements passing beyond their locked positions. It will be noted that the vertical arm 96 and the link 100, when in normal or locked position are in vertical alinement i. e., the pivots 98, 101, 102 are in alinement in a plane which is slightly inclined to the vertical, or in other words in a plane at right angles to the plane of the foot B. A chain 109 adapted to be connected to a treadle or knee-press, has its upper end connected to the outer end of the horizontal arm 97 of said bell crank lever. Thus, upon operation of the knee-press or treadle the toggle will be broken and the support or core 88 together with the post C and the parts mounted thereon, will be depressed to permit the ready insertion or withdrawal of the material, and upon release of said knee-press or treadle the parts will be returned to their normal position by the spring 104.

In order to positively adjust the normal vertical position of the post C and thereby set the machine for materials of different thicknesses, I have provided a hand adjusting shaft 110 which is journaled in a bushing 111 mounted in a tubular bearing bracket 112 secured in an opening 113 formed in the front wall 114 of the standard 5. The bearing bracket 112 is located slightly above the rear edge of the work support G and consequently the shaft 110 is readily accessible to the operator. A finger knob 115 is rigidly attached to the front end of the shaft 110 and is provided with a series of rearwardly projecting teeth 116 arranged concentrically thereon for engagement with a spring pin 117 mounted in the bearing bracket 112. A pointer 118 is fixed to the bracket 112 and overhangs the knob 115 for cooperation with a series of numerals 119 arranged sequentially on the front face of the knob. The inner end of the bracket 112 is provided with a pair of arms 120, 120 in which is fixed a horizontal bearing pin 121 on which is journaled a worm wheel 122 which is in constant mesh with a worm 123 formed on the inner end of the shaft 110. Journaled in the base arm 8 and extending longitudinally thereof is a rock shaft 124 having a rock arm 125 fixed to its right hand end, said arm being pivotally connected as at 126 to the lower end of a link 127, the upper end of the link being pivotally connected as at 128 to the worm wheel 122. The other end of the rock shaft 124 registers with the base arm 9 and fixed thereon is a rock arm 129 which is pivotally connected as at 130 to the rear end of a rack bar 131 which extends forwardly along the base arm 9 to a point below and in front of the horizontal shaft 99. The rack bar 131 is provided along its upper forward edge with rack teeth 132 which engage the teeth of a pinion 133 fixed on said shaft 99. A disc 134 is journaled on the shaft 99 and is provided with a pin 135 forming a support for the front end of said rack bar. A coil spring 136 has its rear end connected to a pin 137 supported on the disc above the pinion 133 and its forward end anchored by a pin 138 fixed to the base arm 9. The disc 134 is in the nature of a lever and the spring 136 exerts a pull on the upper end of the lever to maintain the rack bar in yieldable engagement with the pinion. Thus when the knob 115 is rotated the rack bar 131 will be moved endwise, the shaft 99 together with the eccentric 98 will be rotated, and the post C will be raised or lowered, depending on the direction of rotation of the knob.

A top feeding mechanism is employed for intermittently feeding the material rearwardly in timed relation to the needle reciprocations. A 4-motion feed dog 139 cooperates with the clamping plates 30, 30 of the work clamp E and operates in the opening 10 of the presser foot B. The feed dog is fixedly secured to the front end of a feed lever 140 which extends longitudinally of the forwardly extending upper frame arm 7. The rear end of the feed lever is connected to an adjustable eccentric which is indicated as a whole by the reference numeral 141 and which is mounted on the main shaft 11. This adjustable eccentric is of usual construction and therefore a specific description thereof is unnecessary. It will be noted that the feed lever 140 is located adjacent the right hand wall 7b of the frame arm 7.

Formed in the wall 7b of the frame arm 7 are spaced front and rear bearing openings 142, 143 respectively, and adapted to be positioned in either opening is a bearing pin 144 on the inner end of which is fulcrumed the lower end of a vertical link 145. The upper end of the link carries a pivot pin 146 which is adapted to engage in either one of front and rear threaded openings 147, 148 respectively formed centrally in the feed bar, the pivot pin being accessible in either position through an opening 149 formed in the wall 7ᵇ of the frame arm 7 and located above the bearing openings 142, 143. Thus, the fulcrum link for the feed bar may be shifted forwardly or rearwardly relative to the adjustable eccentric and thereby vary the height of the up and down movement of the feed dog. When forming short stitches, say six or more stitches to the inch, the bearing pin 144 is positioned in the front bearing opening 142 of the frame arm 7, and the pivot pin 146 is positioned in the front opening 147 of the feed lever. In this position of the link, the feed dog will clear the fabric and will not interfere with the looper 15.

Heretofore, in blind stitch machines of the forwardly extending stitching arm type, as exemplified in the patent to Dearborn 814,025, Mar. 6, 1906, both the feed bar and the looper rod are supported on the right hand wall of the arm. This arrangement, in order for the looper rod to clear the feed bar, necessitates the relatively low positioning of the looper rod pivot, with the attendant disadvantage of having a portion of the arm or a portion of the looper rod located in a horizontal plane below the foot. This downwardly projecting portion of the arm or rod, or both, causes the stitched work after leaving the presser foot, to be directed downwardly.

In the present invention, the above objection is avoided by supporting the feed bar and the looper rod on the right and left hand walls respectively of the stitching arm, whereby the looper rod pivot may be located in a higher plane than heretofore, and whereby the work may be directed freely under the arm. It will be also noted that in addition to the above, the downward and forward inclination of the arm further assists in the freedom of travel of the work.

In Figures 23 and 24, I have illustrated a modified form of manually operable means for vertically adjusting the post C which is adapted to be employed when a work support is not used. In this construction the horizontal shaft 99 is provided with a gear segment 150 which is located within the housing portion 21 and is in constant mesh with a pinion 151 fixed on the inner end of a horizontal shaft 152 journaled in the wall of said housing portion 21. A hand piece 153 is fixed to the outer end of the shaft 152 and a spring detent 154 cooperates with the hand piece to retain the same in an adjusted position. Thus by turning the hand piece 153, the pinion 151 will actuate the shaft 99, and the eccentric 98 will raise or lower the post C.

A coil spring 131ᵃ has its rear end connected to the rack bar 131 and its rear end anchored to the base arm 9, and functions to take up any loose play in the train of mechanism which actuates the disc.

Instead of employing the toggle lever 95, link 100 and the torsion spring 104, I may employ the construction shown in Figures 25 and 26. In these figures, the vertical arm 155 of a T-lever 156 is fulcrumed on the eccentric 98, and the lever includes forwardly and rearwardly extending arms 157, 158 respectively. A vertical link 159 is pivotally connected at its upper end by the pin 101 to the lug 94 and at its lower end by the pin 102 to the upper end of the vertical arm 155, the lower end being spaced from the hub of the lever. A link 160 is pivotally connected at its forward end as at 161 to the rearwardly extending arm 158 of the lever. A coil tension spring 162 extends longitudinally within the base arm 9 and has its front end connected to the rear end of the link 160 and its rear end connected to a screw eye 163 which has threadable connection with a nut 164 mounted in said base arm. By adjusting the nut 164 the tension of the spring may be varied. When the post is in its normal or highest position, the toggle is in its locked position, and the toggle lever 156 is retained against rearward swinging by means of the rear arm 158 of said lever contacting a horizontal stop pin 165 mounted in the base arm 9. The chain 109 is connected to the forwardly extending arm 157 of the toggle lever, and consequently when the chain is operated the toggle will be broken against the tension of the spring 162 and the post will be depressed.

Instead of employing the rack bar 131 and pinion 133, I may substitute a link 166 having pivotal connection at its forward end as at 167 with a rock arm 168 which as shown is in the form of a disc fixed to the shaft 102. A spring 169 which has one end connected to said disc and the other end anchored to the base, functions to take up any slack between the movable parts.

From the foregoing, it will be seen that I have provided a main frame of the post type wherein the work will have complete freedom in passing rearwardly from the foot and under the arm; that separate manually operable means are located at points remote from the post for operating the post adjusting means and the adjusting means for the ridge-forming element respectively, whereby access to the same may be had when work is in the machine, and that by operating the adjusting means for the ridge-forming element either alternate deep and shallow needle penetrations, or all deep needle penetrations, may be made.

It is of course to be understood that the details of structure and arrangement of parts may be variously changed and modified without departing from the spirit and scope of my invention.

I claim:

1. In a sewing machine, a main frame comprising a standard, upper and lower spaced arms extending laterally from the standard, the upper arm being downwardly and forwardly inclined relative to the lower arm, and an upwardly and forwardly inclined post mounted on the free end of the lower arm and disposed below the free end of the forwardly and downwardly inclined upper arm, the major axis of the forwardly and downwardly inclined upper arm and the major axis of the post being disposed in planes at right angles to each other.

2. In a sewing machine, a main frame comprising a standard, an upper arm extending laterally from the upper end thereof and terminating in a forwardly extending arm, a base arm extending laterally from the lower end of the standard, said forwardly extending arm being downwardly inclined relative to the base arm, and an upwardly and forwardly inclined post mounted on the free end of the base arm and disposed below the free end of the forwardly and downwardly inclined upper arm, the major axis of the forwardly and downwardly inclined upper arm and the major axis of the post being disposed in planes at right angles to each other.

3. In a sewing machine, a main frame comprising a standard, an upper arm extending laterally from the upper end thereof and terminating in a forwardly extending arm, a base arm extending laterally from the lower end of the standard and terminating in a forwardly extending arm, said upper and base arms being disposed one above the other, said forwardly extending upper arm being downwardly inclined relative to the base arm, and an upwardly and forwardly inclined post mounted on the free end of the base arm and disposed below the free end of the forwardly and downwardly inclined upper arm, the major axis of the forwardly and downwardly inclined upper arm and the major axis of the post being disposed in planes at right angles to each other.

4. In a blind stitch sewing machine, the combination with a main frame comprising a standard, upper and lower spaced arms extending from the standard, the upper arm being forwardly and downwardly inclined relative to the lower arm, of a forwardly and downwardly inclined presser foot fixed to the free end of said upper arm, a main shaft journaled in the standard, a stitch forming mechanism including a horizontally reciprocatory needle mounted on the free end of said upper arm above the presser foot and having driving connections with the main shaft, a forwardly and upwardly inclined post mounted on the free end of the lower arm directly under the presser foot, a movable ridge forming element mounted on the post for projecting a ridge of material upwardly through the foot into needle penetrating position, and driving connections between the main shaft and said ridge forming element.

5. In a blind stitch sewing machine, the combination with a main frame comprising a standard, an upper arm extending laterally from the upper end of the standard and terminating in a forwardly extending arm, and a base arm extending laterally from the lower end of the standard and having its free end disposed below the free end of the forwardly extending upper arm, said forwardly extending arm being downwardly inclined relative to the base arm, of a forwardly and downwardly inclined presser foot fixed to the free end of said upper arm, a main shaft journaled in the standard, a stitch forming mechanism including a horizontally reciprocatory needle mounted on the free end of said upper arm above the presser foot and having driving connections with the main shaft, a forwardly and upwardly inclined post mounted on the free end of the base arm directly under the presser foot, a movable ridge forming element mounted on the post for projecting a ridge of material upwardly through the foot into needle penetrating position, and driving connections between the main shaft and said ridge forming element.

6. In a blind stitch sewing machine, the combination with a main frame comprising a standard, an upper arm extending laterally from the upper end of the standard and terminating in a forwardly extending arm, and a base arm extending laterally from the lower end of the standard and terminating in a forwardly extending arm, said upper and base arms being disposed one above the other, said forwardly extending upper arm being downwardly inclined relative to the base arm, of a forwardly and downwardly inclined presser foot fixed to the free end of said upper arm, a main shaft journaled in the standard, a stitch forming mechanism including a horizontally reciprocatory needle mounted on the free end of said upper arm above the presser foot and having driving connections with the main shaft, a forwardly and upwardly inclined post mounted on the free end of the base arm directly under the presser foot, a movable ridge forming element mounted on the post for projecting a ridge of material upwardly through the foot into needle penetrating position, and driving connections between the main shaft and said ridge forming element.

7. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a ridge forming element mounted on the post for projecting a ridge of fabric upwardly through the foot into needle penetrating position; and means for varying automatically the effective height of said ridge forming element prior to certain penetrating strokes of the needle and including a manually operable lever for rendering constant the effective height of said ridge forming element.

8. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge-forming element mounted on the post for projecting ridges of material upwardly through the foot to the needle at a constant height relative thereto, driving connections between the main shaft and the ridge forming element for reciprocating said element and for normally maintaining the effective height thereof constant with respect to the path of needle travel; and manually operable means associated with said driving connections for automatically varying the effective height of the ridge-forming element prior to certain penetrating strokes of the needle.

9. In a blind stitch sewing machine, the combination with a frame including a standard, an upper arm extending from the standard, and a lower arm extending from the standard and disposed below and in spaced parallel relation to the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge-forming element mounted on the post for projecting ridges of material upwardly through the foot to the needle at a constant height relative thereto; and driving connections between the main shaft and the ridge forming element for reciprocating said element and for normally maintaining the effective height thereof constant with respect to the path of needle travel, said driving connections including a motion-transmitting lever having a manually shiftable fulcrum for automatically varying the effective height of the ridge-forming element prior to certain penetrating strokes of the needle.

10. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge forming element mounted on the post for intermittently projecting a ridge of material upwardly through the foot into constant effective needle-penetrating position; driving connections between the main shaft and said element for reciprocating the latter and including a motion-transmitting lever and a shiftable fulcrum for the lever; and means for shifting said fulcrum to vary automatically the effective needle penetrating position of the element prior to certain penetrating strokes of the needle.

11. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge forming element mounted on the post for intermittently projecting a ridge of material upwardly through the foot into constant effective needle-penetrating position; driving connections between the main shaft and said element for reciprocating the latter and including a motion-transmitting lever and a shiftable fulcrum for the lever; and a manually operable lever connected with said fulcrum for shifting the latter to vary automatically the effective needle penetrating position of the element prior to certain penetrating strokes of the needle.

12. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge forming element mounted on the post for intermittently projecting a ridge of material upwardly through the foot into constant effective needle-penetrating position; driving connections between the main shaft and said element for reciprocating the latter and including a motion-transmitting lever and a shiftable fulcrum for the lever; a manually operable lever connected with said fulcrum for shifting the latter to vary automatically the effective needle penetrating position of the element prior to certain penetrating strokes of the needle; and means for retaining said fulcrum in either of its adjusted positions.

13. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge forming element mounted on the post for intermittently projecting a ridge of material upwardly through the foot into constant effective needle-penetrating position; driving connections between the main shaft and said element for reciprocating the latter and including an eccentric journaled on the post, a motion-transmitting lever fulcrumed intermediate its ends on said eccentric, and a manually operable lever for rotating said eccentric to vary automatically the effective needle penetrating position of the element prior to certain penetrating strokes of the needle.

14. In a blind stitch sewing machine, the combination with a frame including a standard, an upper arm extending from the standard, and a lower arm extending from the standard and disposed below and in spaced parallel relation to the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge-forming element mounted on the post for projecting ridges of material upwardly through the foot to the needle at a constant height relative thereto; and driving connections between the main shaft and the ridge forming element for reciprocating said element and for normally maintaining the effective height thereof constant with respect to the path of needle travel, said driving connections including a motion-transmitting lever having a manually shiftable fulcrum for automatically varying the effective height of the ridge-forming element prior to certain penetrating strokes of the needle, and means for retaining automatically the shiftable fulcrum in an adjusted position.

15. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge forming element mounted on the post for intermittently projecting a ridge of material upwardly through the foot into constant effective needle-penetrating position; driving connections between the main shaft and said element for reciprocating the latter and including an eccentric journaled on the post, a motion-transmitting lever fulcrumed intermediate its ends on said eccentric; a manually operable lever for rotating said eccentric to vary automatically the effective needle penetrating position of the element prior to certain penetrating strokes of the needle, and spring means cooperating between the post and the manually operable lever for retaining the eccentric fulcrum in an adjusted position.

16. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a ridge forming element mounted on the post for projecting a ridge of fabric upwardly through the foot into needle penetrating position; and means for varying automatically the effective height of said ridge forming element prior to certain penetrating strokes of the needle and including a manually operable lever supported by the frame and located at a point remote from the post for rendering constant the effective height of said ridge forming element.

17. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge-forming element mounted on the post for projecting ridges of material upwardly through the foot to the needle at a constant height relative thereto, driving connections between the main shaft and the ridge forming element for reciprocating said element and for normally maintaining the effective height thereof constant with respect to the path of needle travel; and a manually operable lever supported by the frame and located at a point remote from the post and associated with said driving connections for automatically varying the effective height of the ridge-forming element prior to certain penetrating strokes of the needle.

18. In a blind stitch sewing machine, the combination with a frame including a standard; an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge forming element mounted on the post for intermittently projecting a ridge of material upwardly through the foot into constant effective needle-penetrating position; driving connections between the main shaft and said element for reciprocating the latter and including a motion-transmitting lever and a shiftable fulcrum for the lever; and means including a manually operable lever supported by the frame at a point remote from the post for shifting said fulcrum to vary automatically the effective needle penetrating position of the element prior to certain penetrating strokes of the needle.

19. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a ridge forming element mounted on the post for projecting a ridge of fabric upwardly through the foot into needle penetrating position; a work support mounted on the frame and disposed in front of the standard and having a portion embracing the post; and means for varying automatically the effective height of said ridge forming element prior to certain penetrating strokes of the needle and including a manually operable lever mounted on the work support at a point remote from the post for rendering constant the effective height of said ridge forming element.

20. In a blind stitch sewing machine, the combination with a frame including a standard, an upper arm extending from the standard, and a lower arm extending from the standard and disposed below the upper arm; of a presser foot fixed to the free end of said upper arm; a main shaft journaled in the frame; a stitch forming mechanism including a horizontally reciprocatory needle mounted on the free end of the upper arm above the presser foot and having driving connections with the main shaft; a post connected to the free end of said lower arm directly under the foot; a reciprocatory ridge-forming element mounted on the post for projecting ridges of material upwardly through the foot to the needle at a constant height relative thereto, driving connections between the main shaft and the ridge forming element for reciprocating said element and for normally maintaining the effective height thereof constant with respect to the path of needle travel; a work support mounted on the frame and disposed in front of the standard and having a portion embracing the post; and a manually operable lever mounted on the work support and located at a point remote from the post and associated with said driving connections for automatically varying the effective height of the ridge-forming element prior to certain penetrating strokes of the needle.

21. In a blind stitch sewing machine, the combination with a stitching arm having spaced walls, of a presser foot fixed to the free end thereof, a stitch forming mechanism mounted on the arm above the foot and including a looper rod supported on one wall of the arm, and a top feed bar supported on the other wall of said arm, said arm, looper rod, and feed bar being all disposed above the plane of the foot.

22. In a blind stitch sewing machine, the combination with a main frame including a standard and a downwardly and forwardly inclined stitching arm extending from the upper end thereof and having spaced walls, of a presser foot fixed to the free end of said arm, a stitch forming mechanism mounted on the arm above the foot and including a looper rod supported on one wall of the arm, and a top feed bar supported on the other wall of said arm, said arm, looper rod, and feed bar being all disposed above the plane of the foot.

23. In a sewing machine, a main frame comprising a standard, upper and lower spaced arms extending laterally from the standard, the upper arm being downwardly and forwardly inclined and having spaced walls, an upwardly and forwardly inclined post mounted on the free end of the lower arm and disposed below the free end of the forwardly and downwardly inclined upper arm, the major axis of the forwardly and downwardly inclined upper arm and the major axis of the post being disposed in planes at right angles to each other, of a presser foot fixed to the free end of the upper arm, a stitch forming mechanism mounted on the arm above the foot and including a looper rod supported on one wall of the arm, and a top feed bar supported on the other wall of said arm, said arm, looper rod, and feed bar being all disposed above the plane of the foot.

24. In a sewing machine, a main frame comprising a standard, upper and lower spaced arms extending from the standard, a vertically adjustable post mounted on the free end of the lower arm below the free end of the upper arm, and manually operable means for vertically adjusting the post including an eccentric journaled on the free end of the lower arm, and an operating connection between the eccentric and the post.

25. In a sewing machine, a main frame comprising a standard, upper and lower spaced arms extending from the standard, a vertically adjustable post mounted on the free end of the lower arm below the free end of the upper arm, and manually operable means for vertically adjusting the post including a horizontal shaft journaled in the free end of the lower arm below the post, an eccentric fixed to said shaft, and an operating connection between the eccentric and the post.

26. In a sewing machine, a main frame comprising a standard, upper and lower spaced arms extending from the standard, a vertically adjustable post mounted on the free end of the lower arm below the free end of the upper arm, and manually operable means for vertically adjusting the post including an eccentric journaled on the free end of the lower arm below the post, a manually rotatable worm shaft journaled in the frame, and operating connections between the eccentric and the worm shaft.

27. In a sewing machine, a main frame comprising a standard, upper and lower spaced arms extending from the standard, a vertically adjustable post mounted on the free end of the lower arm below the free end of the upper arm, and manually operable means for vertically adjusting the post including a horizontal shaft journaled in the free end of the lower arm below the post, an eccentric fixed to said shaft, an operating connection between the eccentric and the post, a pinion fixed to said shaft, and a manually operable rack bar engageable with said pinion.

28. In a sewing machine, a main frame comprising a standard, upper and lower spaced arms extending from the standard, a vertically adjustable post mounted on the free end of the lower arm below the free end of the upper arm, and manually operable means for vertically adjusting the post including a horizontal shaft journaled in the free end of the lower arm below the post, an eccentric fixed to said shaft, an operating connection between the eccentric and the post, a pinion fixed to said shaft, a rack bar engageable with the pinion, a manually rotatable worm shaft journaled in the frame, and operating connections between the worm shaft and the rack bar.

29. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post, and means for operating said vertically adjustable means including a manually operable element mounted on the standard.

30. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post, and means for operating said vertically adjustable means including a manually operable element mounted on the standard, and operating connections located within the lower arm and the standard and connecting said vertically adjustable means and said manually operable element.

31. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post, and means for operating said vertically adjustable means including a manually operable worm shaft element mounted on the standard.

32. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post, and means for operating said vertically adjustable means including a manually operable worm shaft element mounted on the standard, and operating connections located within the lower arm and the standard and connecting said vertically adjustable means and said manually operable worm shaft element.

33. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post including an eccentric journaled on the free end of the lower arm below the post, an operating connection between the eccentric and the post, and means for rotating the eccentric including a manually operable element mounted on the standard.

34. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post including a horizontal shaft journaled in the free end of the lower arm below the post, an eccentric fixed to the shaft, and an operating connection between the eccentric and the post, and means for rotating the eccentric including a pinion fixed to the shaft, a rack bar extending longitudinally along the lower arm and engageable with the pinion, a manually operable element mounted on the standard, and operating connections between the element and the rack bar and extending along the base arm and into the standard.

35. In a sewing machine, a main frame comprising a standard, an upper arm extending laterally from the upper end thereof and terminating in a forwardly extending arm, and a lower arm extending laterally from the lower end of the standard and terminating in a forwardly extending arm, said upper and lower arms being disposed in register one above the other; a vertically adjustable post mounted on the free end of the lower arm; and means for vertically adjusting the post comprising a horizontal shaft journaled on the lower arm below the post, an eccentric fixed to said shaft, and operating connections between the post and the eccentric, a pinion fixed to said shaft, a rock shaft extending longitudinally within the laterally extending lower arm, a rack bar engageable with the pinion and operatively connected to the rock shaft, said rack bar extending longitudinally within the forwardly extending lower arm, a manually operable element mounted on the standard, and operating connections between said element and said rock shaft and located within the standard.

36. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post, a manually operable means mounted on the frame at a point remote from the post, and operating connections between said manually operable means and said vertically adjustable means for actuating the latter.

37. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post and including an eccentric supported on the lower arm for rotation about a horizontal axis, a manually operable means mounted on the frame at a point remote from the post, and operating connections between said manually operable means and said eccentric.

38. In a sewing machine, a main frame comprising a standard, upper and lower spaced arms extending from the standard, a vertically adjustable post mounted on the free end of the lower arm below the free end of the upper arm, means mounted on the free end of the lower arm for vertically adjusting the post and including a horizontal shaft journaled on the lower arm below the post, an eccentric fixed to said shaft, and operative connections between the eccentric and the post, a manually operable means mounted on the frame, and operating connections between said manually operable means and said shaft.

39. In a sewing machine, a main frame comprising a standard, upper and lower spaced arms extending from the standard, a vertically adjustable post mounted on the free end of the lower arm below the free end of the upper arm, and manually operable means for vertically adjusting the post including a horizontal shaft journaled in the free end of the lower arm below the post, an eccentric fixed to said shaft, an operating connection between the eccentric and the post, a gear segment fixed to the shaft, a manually operable shaft journaled in the free end of the lower arm, a pinion fixed to the inner end of said manually operable shaft and engageable with the segment, and a hand piece fixed to the outer end of said manually operable shaft.

CHARLES W. MUELLER.